UNITED STATES PATENT OFFICE.

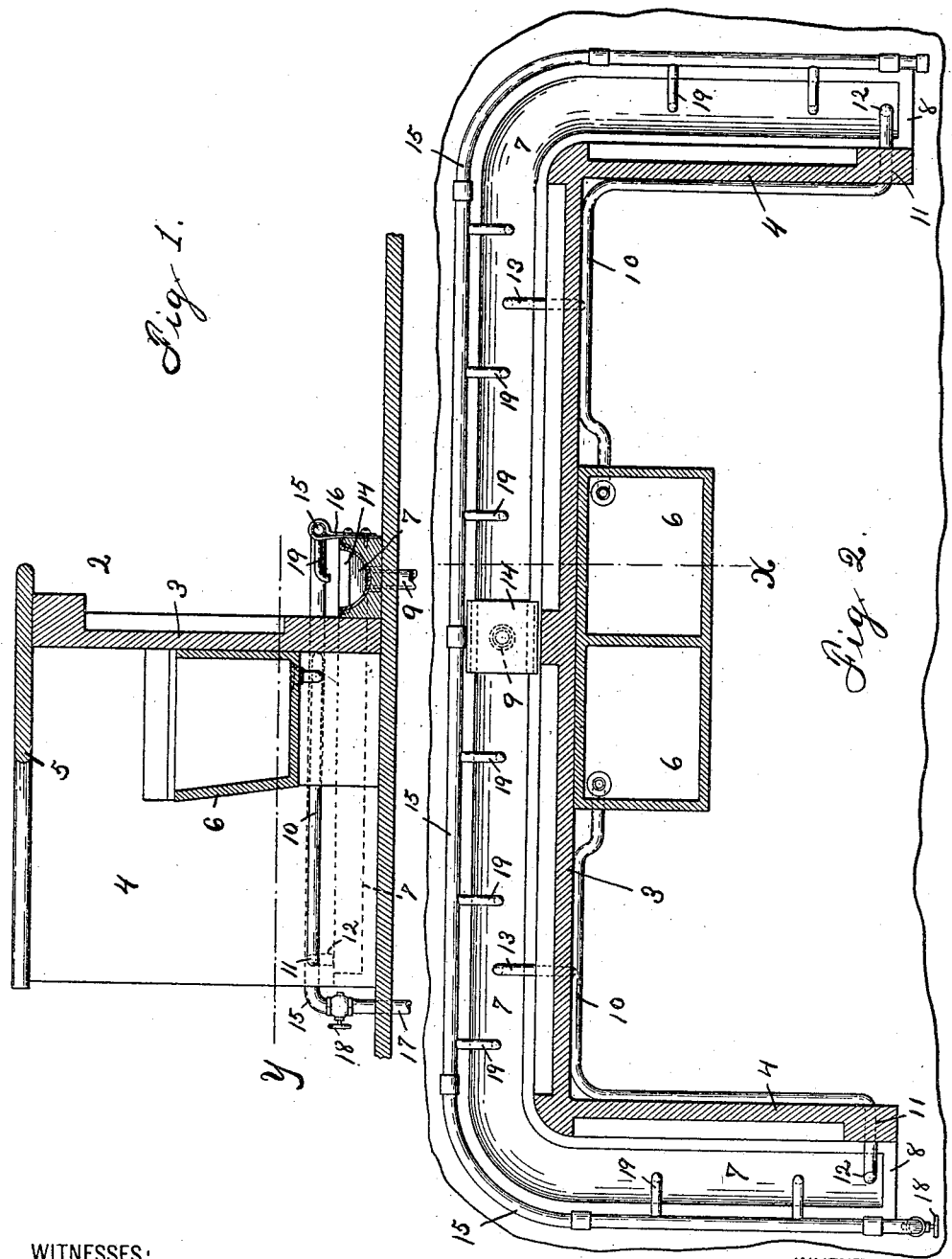

JACOB F. HEIDT, OF NEWARK, NEW JERSEY.

CUSPIDOR ATTACHMENT FOR BARS.

No. 824,651.      Specification of Letters Patent.      Patented June 26, 1906.

Application filed August 20, 1904. Serial No. 221,469.

*To all whom it may concern:*

Be it known that I, JACOB F. HEIDT, a citizen of the United States, residing at Newark, in the county of Essex and State of New Jersey, have invented certain new and useful Improvements in Cuspidor Attachments for Bars; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide for saloon-bars and the like a continuous cuspidor or sort of open sewer at the base of the same, to thereby secure convenience of expectoration on the part of those standing at the bar, to obtain greater cleanliness of the floor and base of the bar, to obtain more sanitary and pleasing conditions, and to secure other advantages and results, some of which may be hereinafter referred to in connection with the description of the working parts.

The invention consists in the improved cuspidor attachment for bars and in the arrangements and combinations of parts of the same, all substantially as will be hereinafter set forth and finally embraced in the clauses of the claim.

Referring to the accompanying drawings, in which like numerals of reference indicate corresponding parts in each of the figures, Figure 1 is a vertical transverse section of a bar of my improved construction upon line *x*, Fig. 2; and Fig. 2 is a horizontal section as upon line *y*, Fig. 1, showing the cuspidor attachment in plan.

In said drawings, 2 indicates a bar having a front 3, rearwardly-extending ends 4 4, and a top 5, all of which may be of any ordinary construction. Within said bar are arranged tanks 6 6, adapted to be filled with water by any suitable means and employed in rinsing or washing out glasses. At the base of the bar on its outer or front side is arranged a broad shallow trough 7, extending preferably around the bar and being closed at its opposite ends and at or about its middle having a pipe 9 leading therefrom to the street-sewer or any suitable discharge-outlet. Preferably the said trough 7 slopes from its ends 8 to the said sewer connection, and said sewerpipe 9 may be provided with any suitable trap means (not shown) common in plumbing.

The drain or outlet pipes 10 from the rinsing-tank 6 instead of leading directly to sewer connections are carried around the walls 3 4 at the inside of the bar and opening through said walls, as at 11, discharge directly into the tank 7 by nozzles 12. The trough 7 is designed to be used throughout its entire length as a cuspidor by those standing at or near the bar, and at intervals the same is flushed by discharging the contents of the rinsing-tanks 6 when securing a fresh supply of rinsing-water. The cuspidor is thus cleansed, and that without the use of any extra water, unless the bartender wishes to use more. Other discharge - nozzles may project from the rinsing-tank dischargepipes 10 through the walls of the bar into the cuspidor-trough, and obviously any number of them may be used. Preferably, moreover, a plate 14 is laid over the sewer-outlet 9 from the trough 7 to cover the same.

The usual bar foot-rail 15 is provided at the front edge of the cuspidor-trough 7, being supported thereon by brackets 16 of any suitable construction. I prefer to make this rail tubular and employ the same where desired to secure further flushing of the trough 7. To this end the tubular rail 15 is connected at one end, as 17, with a water-supply controlled by a valve 18, and along its length are any number of discharge pipes or nozzles 19, adapted to direct a stream of water into the trough. With the additional water-supply afforded by the tubular rail 15 it is obvious that the trough may be more perfectly and completely washed out, and indeed the water could be left running all the time, if desired.

It may be particularly noted that the conduit 15, extending longitudinally before the front of the bar, serves the second function of a foot-rest, and to this end it lies along and above the front of the trough. Thus additional conduits are rendered unnecessary; but to prevent the water from said conduit thus lying at or a little outside of the vertical plane of the front of the trough from falling to the floor, especially when there is but little pressure upon the water, I have provided the series of downwardly-turned branch pipes or nozzles 19, by which the water from the foot-support is directed downward into the center of the waterway of said trough and is thus prevented positively from wetting the floor, The foot-rail 15 serves all the conveniences of a foot-rail, and therefore has a great strain brought upon it to bend it, so that it has been found very necessary to not weaken said foot-rail in adapting it to the purposes of a water-supply. Hence I have employed the holes tapped into the side of said tubular foot-rail and into which the ends of the spouts 19 are screwed tightly, so that there is no weakening of the walls of the tube, such as would result from slits or mere openings. The round end of the spout fitting tightly the tapped hole fills it as solidly as would the original metal, and at the same time exit for the water is provided. The foot-rail is therefore of its maximum strength to serve as a rail, while it is also capable of acting as a water-supply.

It should be noted that at the side of the trough 7 next to the bar, and which is the portion receiving the greater part of expectorations, my improved construction offers few projecting water-supply parts to obstruct access to the trough. This is accomplished by utilizing the water-supply pipe 10 inside of the bar and having the spouts 13 projecting out through the wall of the bar and over the edge of the trough at right angles thereto. Obviously by this means only the ends of the spouts are exposed at all, and these are directed toward the users of the cuspidor, so as to present a minimum obstruction. Furthermore, when both series of the water-supply are employed—that is, the pipes 10 within the bar and the foot-rail 15—the spouts 13 19 of said water-pipes are arranged alternately with respect to each other along the length of the trough 7, and all of them have their extremities directed downward toward the bottom of the trough along its median line. In this way a maximum water-supply is obtained with a minimum of obstruction at the top of the trough. Especially is this so, since the spouts are all tubes whose diameter is very small in comparison to the dimensions of the trough, so that said spouts are comparatively unobtrusive.

Having thus described the invention, what I claim as new is—

The combination with a bar, of a trough extending along the base of said bar contiguous to its front or outer side and having raised side walls parallel thereto, a water-pipe inside the bar substantially parallel to said trough, tubular discharge-spouts leading horizontally from said pipe through the wall of the bar over the adjacent side wall of the trough, brackets extending upward from the front or outer side wall of said trough, a tubular foot-rail supported by said brackets and having holes tapped in its side next the said trough, and tubular spouts screwed into said holes and projecting over the trough, all said spouts being at substantially right angles to the length of the trough and having extremities directed downward toward the bottom of the trough and all arranged along the median line of the trough, the spouts on opposite sides of the trough alternating with each other in position longitudinally of the trough.

In testimony that I claim the foregoing I have hereunto set my hand this 10th day of August, 1904.

JACOB F. HEIDT.

Witnesses:
RUSSELL M. EVERETT,
M. V. DOYLE.